(12) United States Patent
Wakelin et al.

(10) Patent No.: US 10,489,224 B1
(45) Date of Patent: Nov. 26, 2019

(54) MANAGING APPLICATION PROGRAMMING INTERFACE REQUESTS

(71) Applicant: INTERNATIONAL BUSINESS MACHINES CORPORATION, Armonk, NY (US)

(72) Inventors: Philip I. Wakelin, Hampshire (GB); Martin W. J. Cocks, Hampshire (GB); Andrew P. Bates, Winchester (GB); Catherine M. Moxey, Newbury (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/048,425

(22) Filed: Jul. 30, 2018

(51) Int. Cl.
*G06F 9/54* (2006.01)

(52) U.S. Cl.
CPC ................... *G06F 9/547* (2013.01)

(58) Field of Classification Search
None
See application file for complete search history.

(56) References Cited

U.S. PATENT DOCUMENTS

2011/0314145 A1\* 12/2011 Raleigh ............... H04L 41/0893
709/224
2015/0220734 A1   8/2015 Nalluri et al.
2016/0057107 A1\* 2/2016 Call ........................ H04L 63/02
726/11
2017/0010886 A1   1/2017 Mac Mahon et al.
2017/0242691 A1   8/2017 Ghouti et al.

FOREIGN PATENT DOCUMENTS

CN          104408366 A         3/2015

\* cited by examiner

*Primary Examiner* — Craig C Dorais
(74) *Attorney, Agent, or Firm* — Cantor Colburn LLP; Teddi Maranzano

(57) ABSTRACT

We propose a rule-based system, whereby API requests issued by an application program are screened by policy rules before being acted on by an API, where the policy rules are sensitive to the runtime environment. A policy manager is arranged to screen API requests transmitted by the application program against a set of rules to decide whether a particular API request should be allowed to proceed to the API unchanged or be trapped. Trapping an API request causes an API response to be generated according to the rule that trapped the API request, and then transmission of the generated API response to the application program. This allows dynamic modification of the application program's behavior by the customer in order to respond to changes in the server runtime environment without having to modify the application program by configuring one or more policy rules to influence API request handling.

17 Claims, 5 Drawing Sheets

```
<rule type="api">
    <name>rule</name>
    <description>desc</description>
    <condition>
        <api function="START" />
        <count item="tasklimit" operator="GT" unit="n" value="10" />
    </condition>
    <action>
        <apiModify>
            <response code="SYSBUSY" />
            <reason code="99" />
        </apiModify>
    </action>
</rule>
```

MANAGING APPLICATION PROGRAMMING INTERFACE REQUESTS

The present disclosure relates to management of requests issued by an application programming interface (API) to an application server.

BACKGROUND

An application server acts as a set of components accessible to a programmer or developer through an API. An example application server is CICS® (Customer Information Control System) transaction server (TS) which is a product range of International Business Machines Corporation (IBM®) of Armonk, N.Y., United States. CICS TS operates under the z/OS® operating system. IBM, CICS and z/OS are trademarks of IBM.

An API is defined by a set of API commands which can be classified into different kinds of functionality. Typically some API commands will be quite general (e.g. authentication and password management, standard manipulations of containers or documents through insert, delete etc.), whereas others will reflect the detailed programming environment available for the particular application server (e.g. CICS business transaction services used to control the execution of complex business transactions). An API request is a code portion made up of one or more API commands that is sent to the application server to solicit an API response returning a result. In a situation where the application server cannot process the API request, the API response is in the form of an error code which hopefully provides some fairly specific information as to why the solicited response could not be generated.

Especially for large applications, modifying application code, e.g. to customize the code for a particular customer's needs, can be quite time consuming. For testing modified application code during development, it is often not possible or desirable to provide access to a full live system, or a full shadow test system. To assist developers or programmers in testing modified application code, the approach of so-called API mocking has gained popularity in recent times. API mocking refers to the idea of creating mocked-up versions of APIs for the purpose of testing modified application code, where the mocked-up API does not represent a fully virtualized copy of the real API, but rather simply includes enough functionality to create plausible API responses to API requests received from the application code being tested by the developer. Therefore the component with rewritten code that is to be tested "thinks" it is interacting with a remote service via a suitable API, but in fact the remote service is not present and the API is not the "real" API, but rather a mock API designed for the purpose of returning a plausible API response or cross-section or API responses to the component under test.

Another known approach is it use a user exit. A user exit is a bespoke program which modifies how a software component has been written to operate under standard conditions. They are used by customers to modify standard packages to provide customized functionality. For APIs, a user exit can be written which intercepts API commands on their way to the application program, and decides whether they should be routed onward to the application program with or without modification. However, the user exit program needs to be written, compiled, installed and tested, which represents a significant task which needs to be completed before the modified application code itself can be tested.

SUMMARY

We propose a rule-based system, whereby responses to API commands provided by an application server can by modified by the application server depending on conditions in the runtime environment.

According to one aspect of the disclosure, there is provided a server system comprising:

an application program interface, API, via which the application program is able to communicate with a service by transmitting API requests and receiving API responses; and a policy manager arranged to screen API requests transmitted by the application program against a set of rules to decide whether a particular API request should be allowed to proceed to the API unchanged or be trapped, wherein trapping an API request causes:

generation of an API response according to the rule that trapped the API request; and transmission of the API response to the application program.

The usual function of the API of forwarding an API request to the intended service, and then later passing the API response generated by the service back to the application program is therefore replaced with a function whereby the API traps the API request and itself generates a response for the application program.

In certain embodiments, each API request includes at least one API command selected from a set of available API commands, and each rule is specific to one or more of the available API commands Here we note that in current CICS implementations there is only one API command per API request, but it is possible that in future releases this rule may be relaxed to allow multiple API commands per API request.

It provides for increased flexibility if the rules can be switched on and off, i.e. activated and deactivated, in the policy manager. The policy rules can be updated by a system administrator as desired, e.g. to add new rules, modify or delete existing rules. A system administrator can also control whether existing rules are active or inactive, or indeed creates rules that automatically make decisions on when to activate and deactivate themselves or other rules. Therefore, at any one time only those rules which are defined as being useful or appropriate are applied.

In addition to providing rights to allow the activation and deactivation of individual rules to be controlled externally by a system administrator, rules may be reconfigurable automatically by logic contained in the rules themselves. For example, each rule can be provided with a flag which may be toggled between an active state and an inactive state, wherein only active rules are applied to screen API requests. It may be useful if one or more of the rules applies logic to itself which toggles the flag according to the logic. The logic may incorporate one or more factors selected from the group of: a date/time parameter; a busy-ness level of the service to which the API request is addressed; and a busy-ness level of the server for cases in which the service to which the API request is addressed is hosted by the server. The system may incorporate administrator rights which include a right to enable a system administrator to set the flags. For example, a rule which modifies behavior during normal working hours (e.g. Monday to Friday: 07:00 to 18:00) may activate and deactivate itself based on a time check.

In certain embodiments, one or more of the rules includes a variable scalar parameter whose value provides a threshold that is applied when deciding whether to trap an API request. The variable parameter can for example be one of: a busy-ness level of the service to which the API request is addressed; and a busy-ness level of the server for cases in which the service to which the API request is addressed is hosted by the server. System administrator rights may also include a right to enable a system administrator to set the value of the variable scalar parameter.

In certain embodiments, the policy manager includes an API request counter. The API request counter maintains a counter value representing how many pending API requests currently exist. This can be measured by deducting the number of API responses that have been handled by the policy manager in the current session from the number of API requests that the policy manager has generated itself, or seen pass through from the API layer to the application program. One or more of the rules can then refer to the counter value and use it as a factor when deciding whether to trap an API request. In the case of multiple APIs, a separate counter for each API may be maintained.

As well has having options to trap an API request, or to allow an API request to pass without modification, one or more of the rules may have a decision option whereby an API request is allowed to proceed to the API after being processed in a manner specified by the rule, e.g. modified in some way or delayed by an amount of time conditional on passing a test such as a busy-ness test on the resource or service to be called, before being allowed to proceed to the API.

It will be understood that the server system may further comprise the service that is addressed by the API requests. The service may be hosted by the same server that hosts the application program, or may be externally hosted, e.g. may be an externally hosted database or application. There may of course also be multiple services accessed by the application program. In this case, typically there would be a separate API for each service. A single policy manager could be used to screen API requests to all the services. Alternatively, separate policy managers for each API could be provided.

According to another aspect of the disclosure, there is provided a computer automated method of managing API requests transmitted by an application program to an API, the API being used as an intermediary to enable communication between the application program and a service. The method comprises:

providing a set of rules for policing API requests; and screening API requests transmitted by the application program against the set of rules to decide whether a particular API request should be allowed to proceed to the API unchanged or be trapped, wherein following trapping of an API request the method further comprises:

generating an API response according to the rule that trapped the API request; and transmitting the API response to the application program.

In certain embodiments, each API request is made up of one or more API commands from an available set of API commands. Moreover, each rule is specific to one or more of the available API commands. For example, each rule may be specific to one API command, or may be specific to two or more API commands, or may be specific to the API request containing a combination of two or more API commands.

In certain embodiments, each rule is provided with a flag which may be toggled between an active state and an inactive state, wherein only active rules are applied to screen API requests. Moreover, one or more of the rules can be configured to apply logic to itself which toggles the flag according to the logic. The logic may for example incorporate one or more factors selected from the group of: a date/time parameter, a busy-ness level of the service to which the API request is addressed; and a busy-ness level of the server for cases in which the service to which the API request is addressed is hosted by the server.

One or more of the rules may include a variable scalar parameter whose value provides a threshold that is applied when deciding whether to trap an API request. This could be a parameter that is an integer and can adopt one of several discrete values, or it could be a real number capable of adopting a continuum of values. For example, the variable parameter could be one of: a busy-ness level of the service to which the API request is addressed; and a busy-ness level of the server for cases in which the service to which the API request is addressed is hosted by the server.

In certain embodiments, the policy manager includes an API request counter. The API request counter maintains a counter value representing how many pending API requests currently exist. This can be measured by deducting the number of API responses that have been handled by the policy manager in the current session from the number of API requests that the policy manager has generated itself, or seen pass through from the API layer to the application program. One or more of the rules can then refer to the counter value and use it as a factor when deciding whether to trap an API request.

According to another aspect of the disclosure, there is provided a computer program stored on a computer readable medium and loadable into the internal memory of a computing device, comprising software code portions, when said program is run on a computing device, for performing the above-defined method. A computer program product may also be provided which stores the above-mentioned computer program.

Our proposed approach is capable of delivering one or more of the following benefits. The application program does not need to be aware that a set of policy rules exist or whether any particular rule is active or inactive. Customization of the application program's behavior, e.g. to meet customer requirements, can be achieved without having to modify the application program in any way. A desired customization can be managed by a system administrator simply by configuring one or more policy rules to influence API request handling. Application behavior can thus be changed without having to redevelop the application with the consequent compiling, building and testing activity.

The policy rule approach makes it easy to apply different API handling behaviors, e.g. by applying different rules in different environments, or the same rule with different thresholds depending on the environment. For example, different rules may be applied for test and production or different thresholds may be applied to the same rules for test and production.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
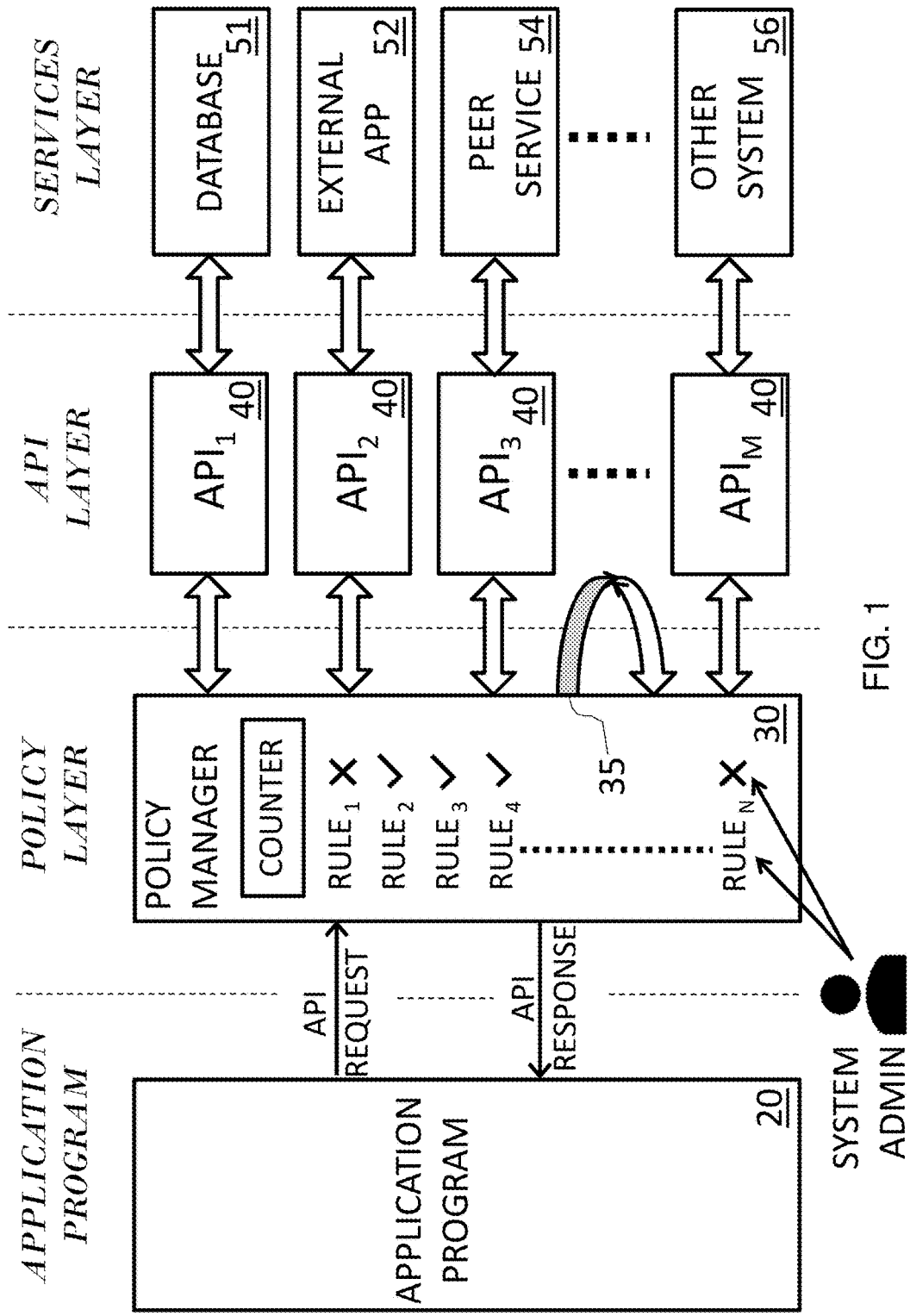
FIG. 1 is a system drawing showing an embodiment of the disclosure.

FIG. 1 is a system drawing showing an embodiment of the disclosure in which the various parts are shown in layers. Conventionally, an application program 20 interacts directly with one or more APIs 40 in an API layer, each API being specific to a service which the application program interacts with. By way of example, FIG. 1 shows the following services: database 51, external application 52, peer service 54 and an arbitrary other system 56. Some services may be hosted on the application server which hosts the application program, whereas other services may be hosted externally. As is conventional, the application program 20 transmits API requests, each containing one or more API commands, to an API 40 in order to solicit a response, i.e. an API response, from one of the services. According to the present disclosure an additional policy layer comprising a policy manager 30 is inserted between the application program 20 and the APIs 40. The policy manager 30 has the function of storing one or more policy rules, with 'N' rules being illustrated by way of example.

In one embodiment, a policy rule will contain the following information:
the API command to which it applies;
the test to be applied (e.g. a test such as: Is API to be avoided for test purposes? Is component part of the test environment? Are there more than 'n' waiting requests? Are there more than 'n' connections established already? Is a component that would be called by executing the API command unavailable? Decision based on time/date? Decision based on resources consumed by the application. Decision based on status of a global indicator such as trace level.);
the new return (error) code and other applicable fields to be returned to the API as a response to the trapped API request.

At any one time each rule may be active or inactive, as illustrated by the check and cross symbols shown alongside each rule. The rules held by the policy manager 30 are configurable by a system administrator as schematically illustrated. The system administrator has rights to activate and deactivate each rule. The system administrator also has rights to modify rules, delete rules and add new rules. We discuss how the policy manager 30 operates in detail further below. The policy rules are thus individually and collectively configurable. The role of a particular rule is to screen a particular type of incoming API request. Typically, a rule will be defined to be specific to a particular API command or combination of API commands Applying the rule will result in one of several outcomes. One possible outcome is that the rule decides to allow the API request to pass to its intended API unaffected. Another possible outcome is that the rule blocks further passage of the API request to the API and instead processes the API request and generates an API response according to the rule's definitions. This possibility is shown schematically in FIG. 1 by the return arrow 35. More nuanced outcomes are also possible, such as delayed or modified transmission of the API request to the intended API. For example, the rule may invoke programmatic functions, such as a function that modifies the payload of an API request, e.g. by compressing its contents, before allowing it to pass to the API.

Figure 2:
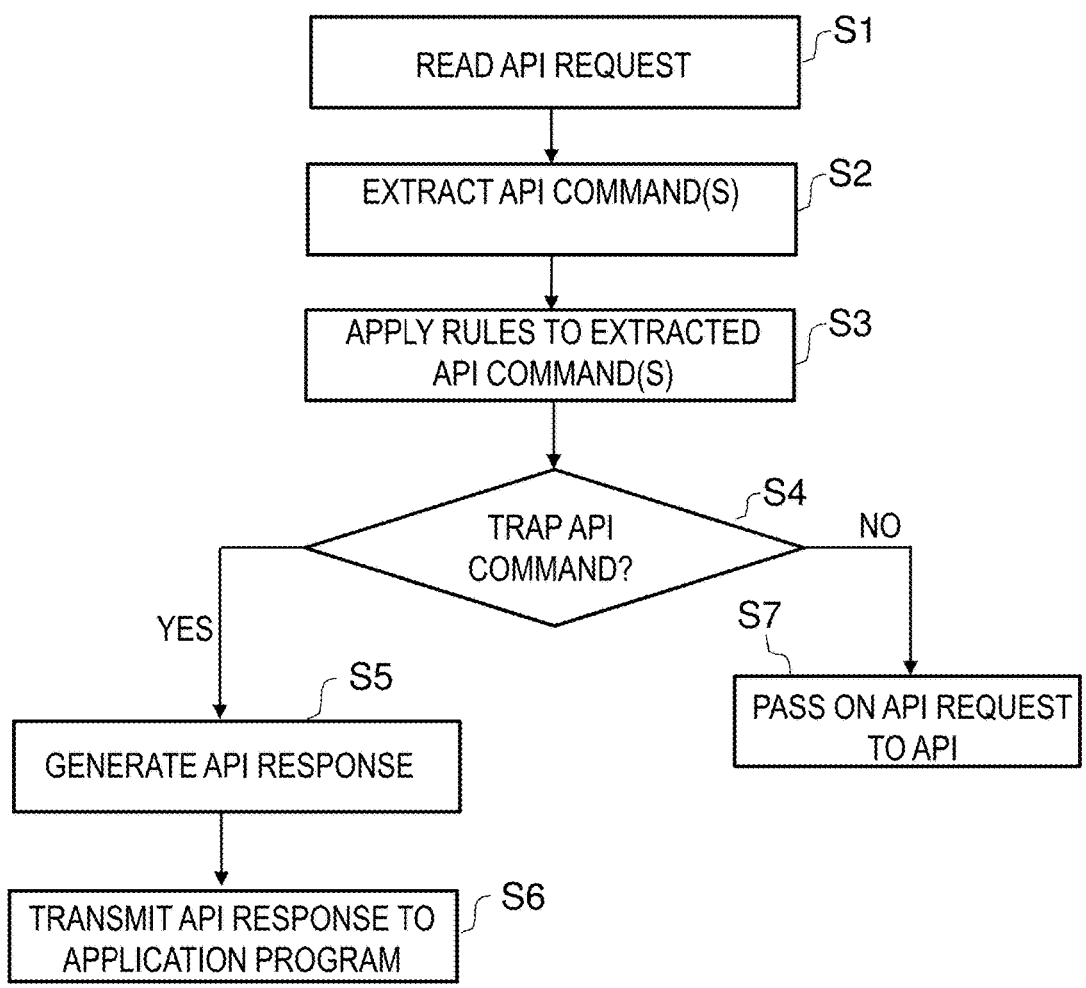
FIG. 2 is a flow diagram showing handling of an API request in the system of FIG. 1.

FIG. 2 is a flow diagram showing handling of an API request by the system of FIG. 1. The system context of the process flow is that the application program has generated an API request intended for a service which is to be sent to the relevant API for that service. The policy manager contains a set of rules which are to be used to screen the API request before it reaches the API. The policy manager could be functionally arranged so that it is part of the application program's API request generator. Alternatively, the policy manager could be functionally arranged in a separate policy layer situated between the application program layer and the API layer as schematically illustrated in FIG. 1.

In Step S1, an API request is read by the policy manager.

In Step S2, the policy manager extracts the API command or commands that are contained in the API request.

In Step S3, based on the extracted API command(s), the rules specific to that command or those commands are applied. Each rule that is applied then produces a binary decision to trap or not to trap the API request.

In Step S4, if at least one of the applied rules decides to trap the API request, then it is trapped ('YES' result in FIG. 2).

If none of the applied rules decides to trap the API request, then in Step S7 the API request is passed on, i.e. allowed to proceed, to the intended API ('NO' result in FIG. 2).

Following a 'YES' result in Step S4, the flow proceeds to generate a suitable API response in Step S5. The API response could be in the form of a code which simulates a normal response of the intended API to receiving that API request or command Another alternative is to generate an API response which simulates an error that the intended API might generate from that API request or command. The API response generated in Step S5 could also be in the form of an error code that will contain information relating to which rule caused trapping of the API request and for what reason, together with any other relevant parameters which were material to the rule's trap decision.

Finally, in Step S6, the 'artificial' API response composed by the policy manager is sent to the application program.

To summarize what has just been described, a policy rule is created that defines a non-standard behavior for handling API requests/commands from an application program server. Namely, when an API command subject to a policy rule is issued, the application server reads the policy and modifies its runtime API response to the API command based on conditions in the rule. The policy rules therefore effectively allow a standard program to be customized, e.g. to match the needs of a particular customer, without having to modify the standard program.

Some potential scenarios where the proposed rule-based customization of the management of API requests could be used are as follows.

Example 1

An application could behave differently at different times of the day, so that selected API commands are not permitted to be executed at certain times of the day. That is, when an API request containing such an API command is received, the API request, or at least the part of it containing the impermissible API command, is blocked from being transmitted to the application for processing and instead a suitable error code is returned.

Example 2

Figures 3, 4:
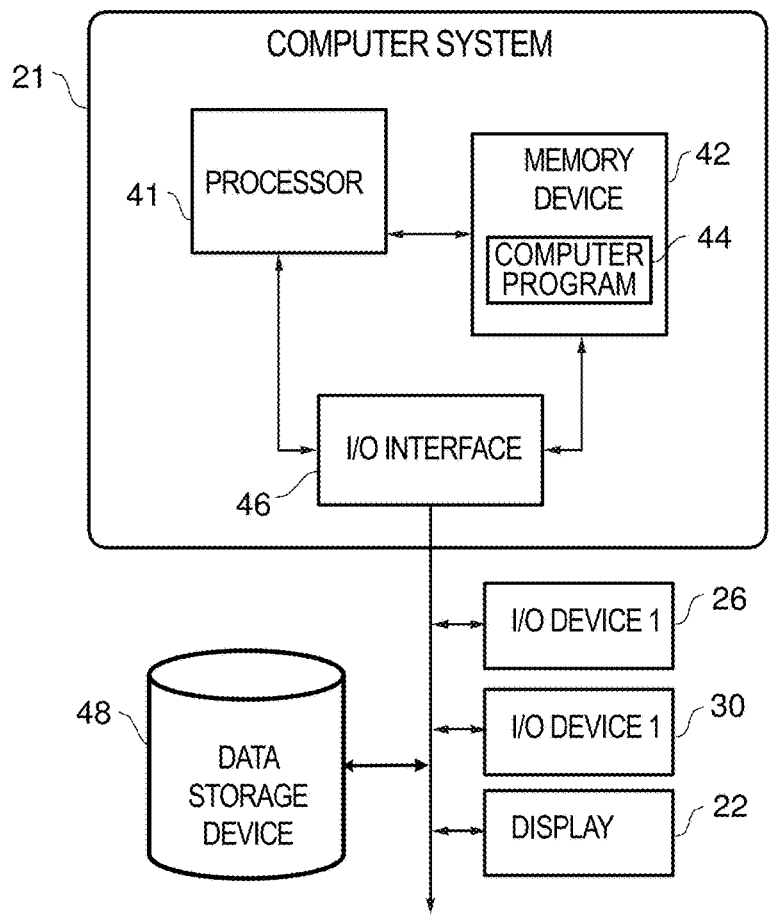
FIG. 3 shows an example rule in xml text.
FIG. 4 shows internal structure of a generic computing device which may represent the internal design of computing elements shown in FIG. 1.

For an application that starts new threads or tasks, a rule could be put in place which blocks API requests that would result in starting a new thread or task when application server load is deemed to be too high. That is, an API request containing an API command the execution of which would create a new thread/task would result in generation of an API response from the application server in the form of an error code indicating that the API command could not be processed, because the system is (too) busy. Moreover, the rule that provokes this API response is activated whenever the application server determines it is at or has exceeded a certain level of usage. The rule could contain one or more factors which are used to determine whether server load is "too high". These factors and their relative weightings when multiple factors are combined into a score may be adjustable, e.g. configurable by a system administrator. The threshold, e.g. a threshold score, may also be adjustable. A rule of this type can be used to mitigate against the risk of an application program placing undue load on an application server which might lead to a system stall or a system crash. FIG. 3 shows an example implementation of such a rule in an xml policy, which demonstrates the modification of an API that starts new threads. This policy rule would modify the behavior of the START API command, when the task count in the application server was greater than 10. In this situation, it would return the defined SYSBUSY response and a reason code of 99, instead of performing the START command as coded.

Example 3

For an application that issues calls to a third party entity, e.g. a remote system or external database, a rule could be put in place to block API requests which would result in the application calling the third party entity. This rule could then in turn be activated and deactivated based on the state of busy-ness of the third party entity, e.g. by reading an overload status flag or other indicator on the third party entity directly or via the application program. When activated, the application server would return an API response with an appropriate error code indicating the third party entity is too busy.

As an aside, it is noted that CICS TS in its current implementation has support for task-based and system-based policies, but does not allow the content of an API response to be modified, which is the subject of the present disclosure.

FIG. 4 shows a generic computing device 21, which may be one of the servers described above. The computing device 21 comprises a processor 41 to provide a processor resource coupled through an I/O interface 46 to one or more external devices. The processor 41 may also be connected to one or more memory devices 42. At least one memory device 42 to provide a memory resource contains a stored computer program 44, which is a computer program that comprises computer-executable instructions. The data storage devices 48 may store the computer program 44. The computer program 44 stored in the storage devices 48 is configured to be executed by processor 41 via the memory devices 42. The processor 41 executes the stored computer program 44.

It will be clear to one of ordinary skill in the art that all or part of the logical process steps of one embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of one embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 5:
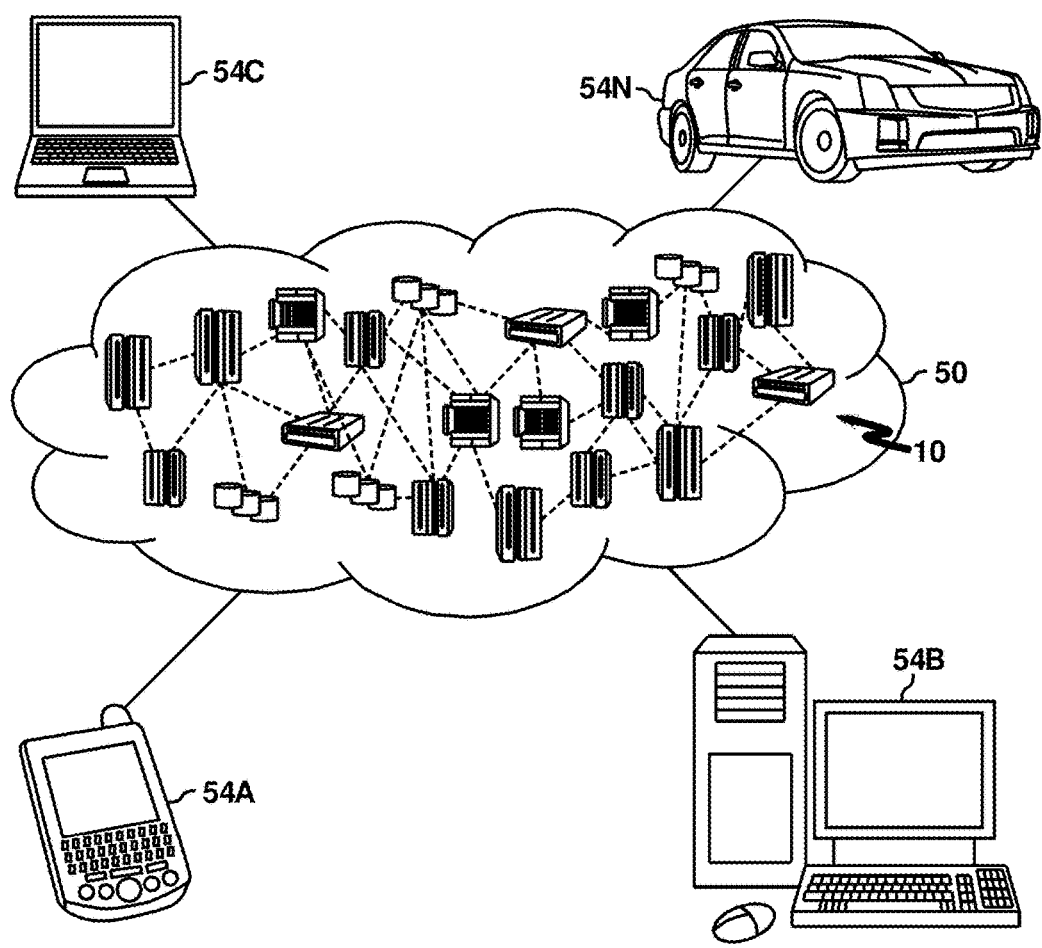
FIG. 5 depicts a cloud computer system according to an embodiment of the disclosure.

Referring now to FIG. 5, illustrative cloud computer system 50 is depicted. As shown, cloud computer system 50 includes one or more cloud computing nodes 10 with which local computing devices used by cloud consumers, such as, for example, personal digital assistant (PDA) or cellular telephone MA, desktop computer MB, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computer system 50 can communicate with any type of computerized device over any type of network and/or network addressable connection (e.g., using a web browser).

Figure 6:
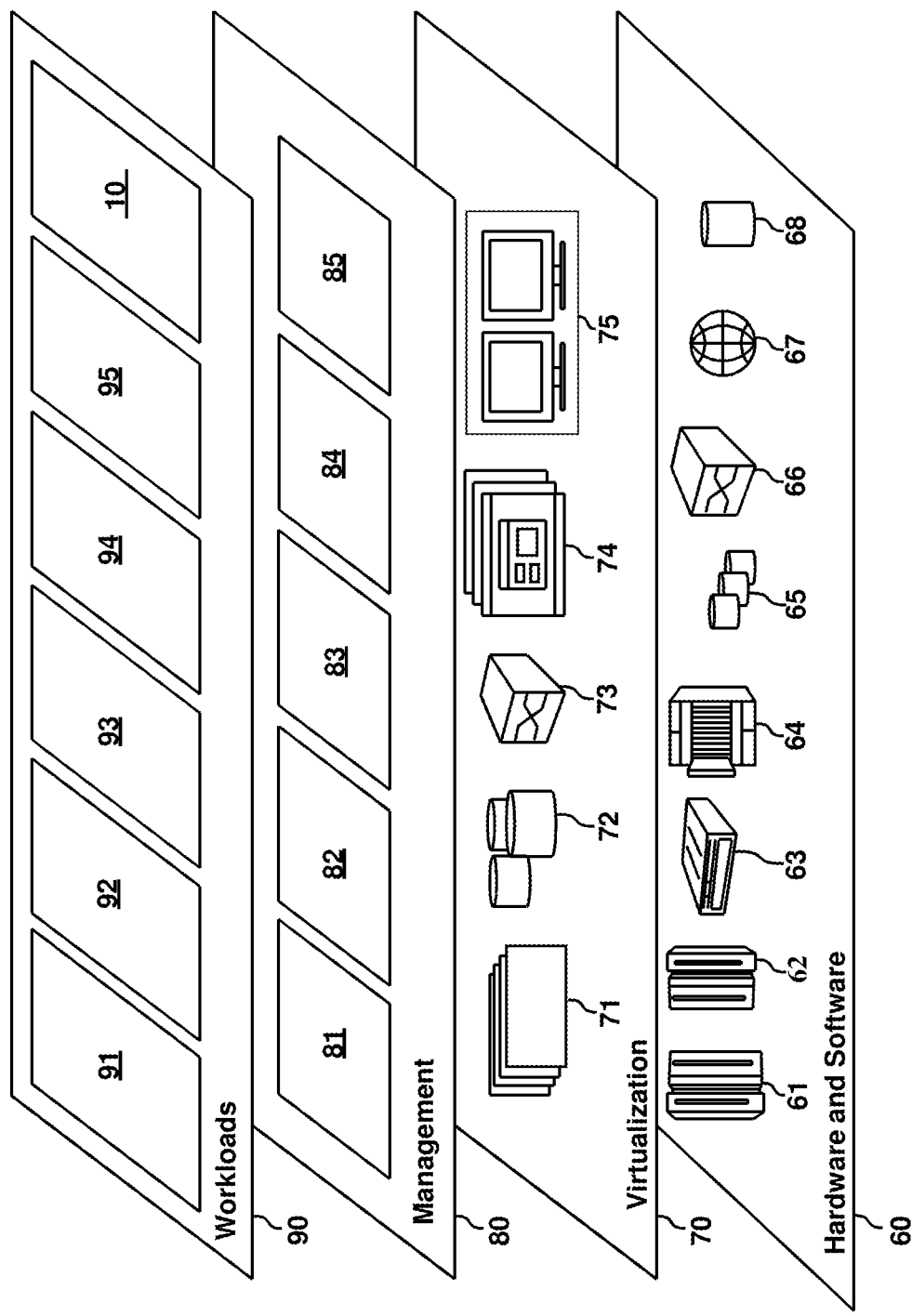
FIG. 6 depicts abstraction model layers according to an embodiment of the disclosure.

Referring now to FIG. 6, a set of functional abstraction layers provided by cloud computer system 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85, provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and server system 10 according to embodiments of the disclosure.

It will be clear to one skilled in the art that many improvements and modifications can be made to the foregoing exemplary embodiment without departing from the scope of the present disclosure.

What is claimed is:

1. A server system comprising:
an application program hosted by a server;
an application program interface, API, via which the application program is able to communicate with a service by transmitting API requests and receiving API responses; and
a policy manager arranged to screen the API requests transmitted by the application program against a set of rules to decide whether a particular API request should be allowed to proceed to the API unchanged or be trapped, wherein trapping an API request causes:
generation of an API response according to a rule that trapped the API request; and
transmission of the API response to the application program, wherein the policy manager includes an API request counter, which has a counter value indicating a number of pending API requests as measured by deducting a number of API responses from a number of API requests, and wherein at least one of the rules uses the counter value as a factor when deciding whether to trap an API request.

2. The system of claim 1, wherein each API request includes at least one API command selected from a set of available API commands, and wherein each rule is specific to one or more of the available API commands.

3. The system of claim 1, wherein each rule has a flag which may be toggled between an active state and an inactive state, wherein only active rules are applied to screen the API requests.

4. The system of claim 3, wherein at least one of the rules applies logic to itself which toggles the flag according to the logic.

5. The system of claim 4, wherein the logic incorporates at least one factor selected from a group of: a date/time parameter; a busy-ness level of the service to which the API request is addressed; and a busy-ness level of the server for cases in which the service to which the API request is addressed is hosted by the server.

6. The system of claim 3, incorporating system administrator rights which include a right to enable a system administrator to set the flags.

7. The system of claim 1, wherein at least one of the rules includes a variable scalar parameter whose value provides a threshold that is applied when deciding whether to trap an API request.

8. The system of claim 7, wherein the variable parameter is one of: a busy-ness level of the service to which the API request is addressed; and a busy-ness level of the server for cases in which the service to which the API request is addressed is hosted by the server.

9. The system of claim 7, incorporating system administrator rights which include a right to enable a system administrator to set the value of the variable scalar parameter.

10. The system of claim 1, wherein at least one of the rules has a decision option which results in an API request being permitted to proceed to the API after being processed in a manner specified by the rule.

11. A computer automated method of managing application program interface, API, requests transmitted by an application program to an API via which the application program is able to communicate with a service, the method comprising:
providing a set of rules for policing API requests; and
screening the API requests transmitted by the application program against the set of rules to decide whether a particular API request should be allowed to proceed to the API unchanged or be trapped, wherein following trapping of an API request the method further comprises:
generating an API response according to a rule that trapped the API request; and
transmitting the API response to the application program, wherein at least one of the rules uses a counter value of an API request counter, which is value indicating a number of pending API requests as measured by deducting a number of API responses from a number of API requests, as a factor when deciding whether to trap an API request.

12. The method of claim 11, wherein each API request includes at least one API command selected from a set of available API commands, and wherein each rule is specific to one or more of the available API commands.

13. The method of claim 12, wherein each rule has a flag which may be toggled between an active state and an inactive state, wherein only active rules are applied to screen the API requests.

14. The method of claim 13, wherein at least one of the rules applies logic to itself which toggles the flag according to the logic, and wherein the logic incorporates at least one factor selected from a group of: a date/time parameter, a busy-ness level of the service to which the API request is addressed; a busy-ness level of a server for cases in which the service to which the API request is addressed is hosted by the server.

15. The method of claim 11, wherein at least one of the rules includes a variable scalar parameter whose value provides a threshold that is applied when deciding whether to trap an API request.

16. The method of claim 15, wherein the variable parameter is one of: a busy-ness level of the service to which the API request is addressed; and a busy-ness level of a server for cases in which the service to which the API request is addressed is hosted by the server.

17. A computer program stored on a computer readable medium and loadable into an internal memory of a server, comprising software code portions, when said program is run on the server, for performing a method comprising:
providing a set of rules for policing API requests; and
screening the API requests transmitted by the application program against the set of rules to decide whether a particular API request should be allowed to proceed to the API unchanged or be trapped, wherein following trapping of an API request the method further comprises:
generating an API response according to a rule that trapped the API request; and
transmitting the API response to the application program, wherein at least one of the rules uses a counter value of an API request counter, which is a value indicating a number of pending API requests as measured by deducting a number of API responses from a number of API requests, as a factor when deciding whether to trap an API request.

* * * * *